United States Patent
Chiruta et al.

(10) Patent No.: US 9,650,933 B2
(45) Date of Patent: May 16, 2017

(54) IN-LINE DECOMPOSITION REACTOR PIPE WITH EXHAUST ASSIST

(71) Applicant: Cummins Emission Solutions, Inc., Columbus, IN (US)

(72) Inventors: Mihai Chiruta, Madision, WI (US); Lindsey R. Henry, Madison, WI (US); Douglas A. Mitchell, Indianapolis, IN (US); Randy G. Zoran, McFarland, WI (US); George E. Mavroudis, Oregon, WI (US); Lauren A. Lynch, Columbus, IN (US)

(73) Assignee: CUMMINS EMISSION SOLUTIONS, INC., Columbus, IN (US)

( * ) Notice: Subject to any disclaimer, the term of this patent is extended or adjusted under 35 U.S.C. 154(b) by 0 days.

(21) Appl. No.: 14/734,911

(22) Filed: Jun. 9, 2015

(65) Prior Publication Data

US 2015/0361849 A1 Dec. 17, 2015

Related U.S. Application Data

(60) Provisional application No. 62/011,776, filed on Jun. 13, 2014.

(51) Int. Cl.
*F01N 13/08* (2010.01)
*F01N 3/20* (2006.01)
(Continued)

(52) U.S. Cl.
CPC ......... *F01N 3/2066* (2013.01); *F01N 3/2892* (2013.01); *F01N 13/08* (2013.01);
(Continued)

(58) Field of Classification Search
CPC ............... F01N 3/2892; F01N 2240/20; F01N 2270/08; F01N 2470/24; B01F 5/0451;
(Continued)

(56) References Cited

U.S. PATENT DOCUMENTS

| 7,497,077 B2 | 3/2009 | Dodge et al. |
| 7,682,586 B2 | 3/2010 | Harold et al. |

(Continued)

FOREIGN PATENT DOCUMENTS

| CN | 102840014 | 12/2012 | |
| DE | 102010035311 A1 * | 3/2012 | ........... F01N 3/2892 |

(Continued)

OTHER PUBLICATIONS

Machine translation of JP 2011038458 A, accessed May 10, 2016.*
(Continued)

*Primary Examiner* — Jonathan Matthias
(74) *Attorney, Agent, or Firm* — Foley & Lardner LLP

(57) ABSTRACT

An exhaust assisted pipe assembly including an outer portion having an opening for receiving dosed reductant from a dosing module and an inner portion disposed within the outer portion. The inner portion defines a main flow path for receiving a first portion of a fluid from an upstream source, and the inner portion and the outer portion cooperatively define a first flow path and a second flow path. The first flow path is configured to direct a second portion of the fluid from the upstream source past the opening for receiving dosed reductant and into the main flow path to increase momentum of the dosed reductant into the main flow path. The second flow path is configured to direct a third portion of the fluid from the upstream source toward the dosed reductant to decrease the momentum of the dosed reductant in the main flow path.

19 Claims, 11 Drawing Sheets

(51) Int. Cl.
  *F01N 3/28* (2006.01)
  *F01N 13/18* (2010.01)
(52) U.S. Cl.
  CPC ...... *F01N 13/1805* (2013.01); *F01N 2610/02* (2013.01); *Y02T 10/24* (2013.01); *Y10T 29/49828* (2015.01)
(58) Field of Classification Search
  CPC ............... B01F 5/0498; B01F 5/0689; B01F 2005/0639
  See application file for complete search history.

(56) References Cited

U.S. PATENT DOCUMENTS

| | | |
|---|---|---|
| 8,240,137 B2 | 8/2012 | Liu et al. |
| 8,549,842 B2 | 10/2013 | Park |
| 2010/0005791 A1* | 1/2010 | Ranganathan ............ F01N 3/36 60/310 |
| 2010/0263359 A1 | 10/2010 | Haverkamp et al. |
| 2011/0094206 A1 | 4/2011 | Liu et al. |
| 2011/0308234 A1 | 12/2011 | De Rudder et al. |
| 2013/0152558 A1 | 6/2013 | Loman |
| 2013/0174537 A1 | 7/2013 | Loman et al. |

FOREIGN PATENT DOCUMENTS

| | | | |
|---|---|---|---|
| EP | 1 741 887 | 1/2007 | |
| EP | 1 990 513 | 11/2008 | |
| EP | 2 014 883 | 1/2009 | |
| EP | 2 282 026 | 2/2011 | |
| EP | 2 339 137 | 6/2011 | |
| EP | 2 339 139 | 6/2011 | |
| EP | 2 388 451 | 11/2011 | |
| EP | 2 465 602 | 6/2012 | |
| GB | WO 2009024815 A2 * | 2/2009 | .......... B01F 3/04049 |
| JP | 2011038458 A * | 2/2011 | |
| WO | WO-2013/112146 | 8/2013 | |
| WO | WO-2013/178321 | 12/2013 | |

OTHER PUBLICATIONS

Machine translation of DE 102010035311 A1, accessed May 10, 2016.*

Search Report from the United Kingdom Intellectual Property Office for United Kingdom Patent Application No. GB1509805.6, issued Nov. 24, 2015, 3 pages.

* cited by examiner

IN-LINE DECOMPOSITION REACTOR PIPE WITH EXHAUST ASSIST

CROSS-REFERENCE TO RELATED PATENT APPLICATIONS

The present application claims the benefit of U.S. Provisional Patent Application No. 62/011,776, filed Jun. 13, 2014, entitled "IN-LINE DECOMPOSITION REACTOR PIPE WITH EXHAUST ASSIST," the entirety of which is incorporated herein by reference.

BACKGROUND

For internal combustion engines, such as diesel or natural gas engines, nitrogen oxide ($NO_x$) compounds may be emitted in the exhaust of a vehicle. To reduce NO emissions, a selective catalytic reduction (SCR) process may be implemented to convert the $NO_x$ compounds into more neutral compounds, such as diatomic nitrogen, water, or carbon dioxide, with the aid of a catalyst and a reductant. The catalyst may be included in a catalyst chamber of an exhaust system. A reductant such as anhydrous ammonia, aqueous ammonia, or urea is typically introduced into the exhaust gas flow prior to the catalyst chamber. To introduce the reductant into the exhaust gas flow for the SCR process, an SCR system may dose or otherwise introduce the reductant through a dosing module that vaporizes or sprays the reductant into an exhaust pipe of the exhaust system up-stream of the catalyst chamber. In some implementations, the dosing module is located at an elbow of the exhaust system. Such a location of the dosing module may permit the use of a low-velocity, small droplet diameter dosing module by utilizing the exhaust flow to disperse the injected reductant. However, such a configuration may be less desirable, as some configurations may not be capable of accommodating an elbow exhaust component.

SUMMARY

One implementation relates to an exhaust assisted pipe assembly that includes an outer portion having an opening for receiving dosed reductant from a dosing module and an inner portion disposed within the outer portion. The inner portion defines a main flow path for receiving a first portion of a fluid from an upstream source, and the inner portion and the outer portion cooperatively define a first flow path and a second flow path. The first flow path is configured to direct a second portion of the fluid from the upstream source past the opening for receiving dosed reductant and into the main flow path to increase momentum of the dosed reductant into the main flow path. The second flow path is configured to direct a third portion of the fluid from the upstream source toward the dosed reductant to decrease the momentum of the dosed reductant in the main flow path.

In some implementations, the fluid is an exhaust gas. In some implementations, the inner portion may be a tubular member. In some implementations, the inner portion may include a first opening and a second opening. The first opening permits the second portion of the fluid to flow from the first flow path into the main flow path, and the second opening permits the third portion of the fluid to flow from the second flow path into the main flow path. In some implementations, at least a portion of the first opening is positioned relative to the opening of the outer portion such that dosed reductant from the dosing module flows into the main flow path through the first opening. In some implementations, the second opening is upstream relative to the first opening, downstream of the first opening, or aligned opposite the first opening. In some implementations, the outer portion and the inner portion include straight tubular pipe portions.

In some implementations, an outlet end of the inner portion is coupled to the outer portion. The inner portion, the outer portion, and the outlet end may define a first cavity for the first flow path, and the outlet end of the inner portion coupled to the outer portion blocks the second portion of fluid flowing along the first flow path from flowing out an outlet end of the first cavity. The inner portion, the outer portion, and the outlet end define a second cavity for the second flow path, and the outlet end of the inner portion coupled to the outer portion blocks the third portion of fluid flowing along the second flow path from flowing out an outlet end of the second cavity.

In some implementations, the third portion of the fluid flowing along the second flow path increases a temperature of a surface of the inner portion. In some implementations, the first flow path and second flow path are separated by one or more walls extending between the outer portion and the inner portion.

Another implementation relates to an exhaust system that includes a first portion of an exhaust system receiving exhaust gas, a second portion of the exhaust system, and an exhaust assisted pipe assembly coupled at an upstream end to the first portion of the exhaust system to receive the exhaust gas from the first portion and coupled at a downstream end to the second portion of the exhaust system. The exhaust assisted pipe assembly includes an outer portion having an opening for receiving dosed reductant from a dosing module and an inner portion disposed within the outer portion. The inner portion defining a main flow path through the inner portion for receiving a first portion of the exhaust gas, and the inner portion and the outer portion cooperatively defining a first cavity defining a first flow path for a second portion of the exhaust gas and a second cavity defining a second flow path for a third portion of the exhaust gas. The first flow path is configured to direct the second portion of the exhaust gas past the opening for receiving dosed reductant and into the main flow path to increase momentum of the dosed reductant into the main flow path. The second flow path is configured to direct the third portion of the exhaust gas toward the dosed reductant to decrease the momentum of the dosed reductant in the main flow path.

In some implementations, the outer portion includes a first tube having a first diameter and the inner portion includes a second tube having a second diameter that is less than the first diameter. In some implementations, the portion includes a mount for a dosing module. In some implementations, the inner portion includes a first opening and a second opening. The first opening permits the second portion of the fluid to flow from the first flow path into the main flow path, and the second opening permits the third portion of the fluid to flow from the second flow path into the main flow path. A portion of the first opening and a portion of the second opening are positioned on opposing sides of the inner portion.

A further implementation relates to a method for assembling an exhaust system with an exhaust assisted pipe assembly. The method includes providing an exhaust assisted pipe assembly having an upstream portion and a downstream portion. The exhaust assisted pipe assembly includes an outer pipe and an inner pipe coupled together at an outlet end of the inner pipe and one or more longitudinal walls extending from the inner pipe to the outer pipe. The outer pipe including an opening for dosing reductant. The inner pipe defines a main flow path through the exhaust assisted pipe assembly. The outer pipe, inner pipe, coupled outlet end, and the one or more longitudinal walls defining a first cavity for a first flow path and a second cavity for a second flow path between the outer pipe and the inner pipe. The inner pipe includes a first opening through the inner pipe to permit exhaust gas flowing along the first flow path to flow through the first cavity and into the main flow path and a second opening through the inner pipe to permit exhaust gas flowing along the second flow path to flow through the second cavity and into the main flow path. A portion of the first opening and a portion of the second opening may be positioned on opposing sides of the inner portion. The method also includes coupling the upstream portion of the exhaust assisted pipe assembly to an upstream portion of an exhaust system and a downstream portion of the exhaust assisted pipe assembly to a downstream portion of an exhaust system. The method further includes mounting a dosing module to a mount of the exhaust assisted pipe assembly.

In some implementations, the second flow path is configured to direct the third portion of the exhaust gas toward dosed reductant to decrease momentum of dosed reductant in the main flow path.

BRIEF DESCRIPTION OF THE DRAWINGS

The details of one or more implementations are set forth in the accompanying drawings, the claims, and the description below. Other features, aspects, and advantages of the disclosure will become apparent from the description, the drawings, and the claims, in which:

Figure 1:
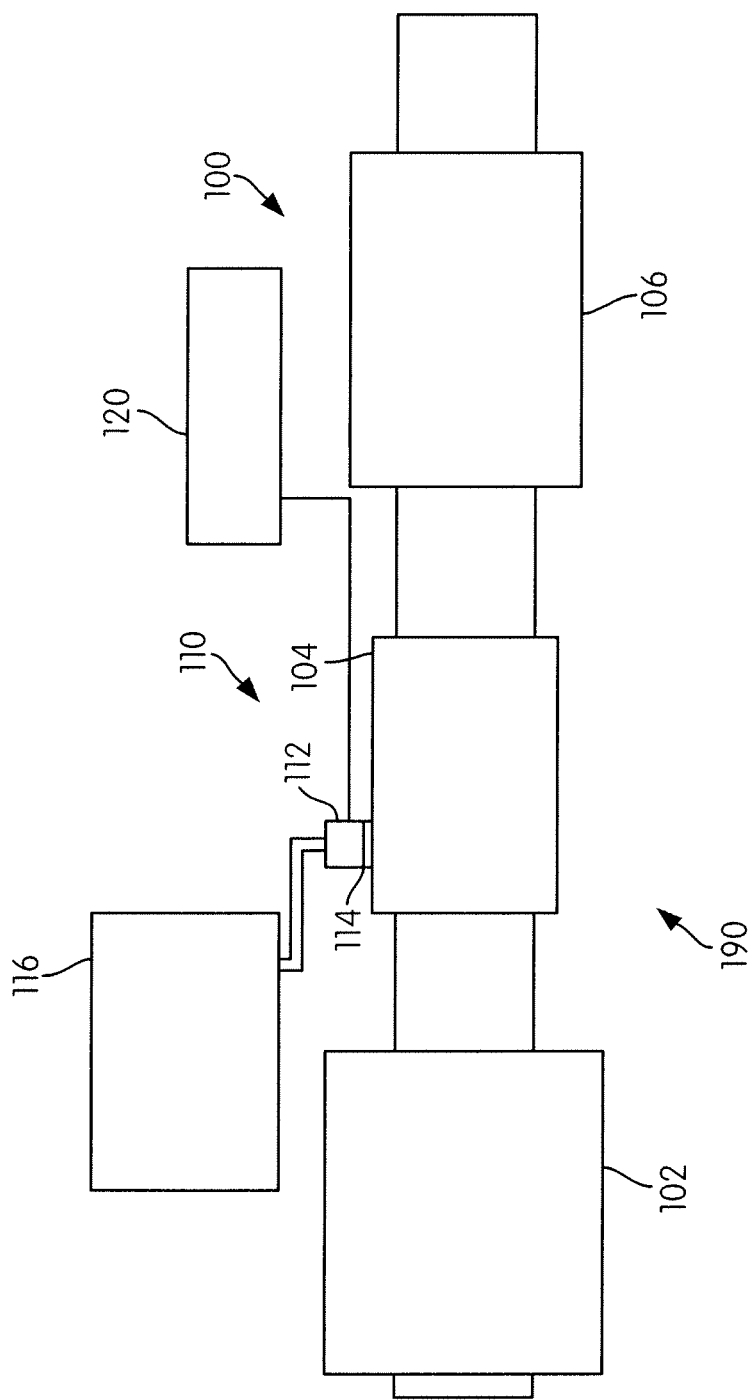
FIG. 1 is a block schematic diagram of an example selective catalytic reduction system having an example reductant delivery system for an exhaust system.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for injecting and mixing reductant into an exhaust flow of a vehicle. The various concepts introduced above and discussed in greater detail below may be implemented in any of numerous ways, as the described concepts are not limited to any particular manner of implementation. Examples of specific implementations and applications are provided primarily for illustrative purposes.

I. Overview

In exhaust systems with SCR systems, various dosing modules and/or exhaust pipe configurations may be utilized. For instance, air-assisted or airless dosing modules may be utilized. In addition, some exhaust systems utilize various bends and straight portions of exhaust pipe for routing the exhaust system. The dosing module for an exhaust system may be positioned at various locations and/or angles to dose reductant into an exhaust system. For example, a dosing module may be positioned at an elbow portion of exhaust pipe of an exhaust system for dosing reductant into the exhaust system, such as substantially axially aligned with a downstream leg of the elbow portion. In other implementations, the dosing module may be positioned on a side of a straight portion of exhaust pipe of an exhaust system for dosing reductant into the exhaust system. In some instances, the dosing module may be angled relative to the exhaust flow at an angle that is non-parallel to the exhaust flow and/or non-perpendicular to the exhaust flow.

In some implementations, to maximize the amount of reductant that is evaporated, dosing modules with sufficient velocity to introduce the reductant into a high velocity exhaust stream may be utilized. However, in lower velocity conditions, such dosing modules may inject reductant at a high velocity such that deposit formations may form on a surface opposite the dosing module. In some implementations, coatings are applied to the sidewalls to substantially prevent or reduce build-up of deposit formations. In other implementations, a dosing module with a lower injection velocity may be utilized. However, in higher velocity exhaust flow conditions, the low velocity of the injected reductant may result in less evaporation and/or mixing of the reductant with the exhaust gases, thereby resulting in poor reductant uniformity.

To accommodate the varying exhaust flow velocities and conditions, a portion of the exhaust flow may be used to assist with the dispersion of reductant into the exhaust system. For instance, a portion of the exhaust flow pattern may be diverted and directed about a nozzle of the dosing module in such a way that the dosed reductant is able to penetrate to the center of the exhaust flow without impinging a sidewall of a decomposition reactor pipe. The exhaust gas diverted to assist the dosed reductant may thus vary with the exhaust gas flowing through the remainder of the exhaust system, thereby providing sufficient momentum to the dosed reductant to penetrate into the main exhaust gas flow. This may also optimize the reductant decomposition in the exhaust flow by minimizing the mass transfer between the dosed reductant and the sidewalls while maximizing the heat transfer between the dosed reductant and the exhaust gases. In addition, the portion of the exhaust flow may protect and/or minimize tip temperatures of the dosing module while continually cleaning the tip of the dosing module to prevent deposit formation.

In some further implementations, a second portion of the exhaust flow may be used to slow the dosed reductant prior to coming into contact with the sidewall of a portion of the exhaust system. That is, a second portion of the exhaust may be diverted opposite the dosing module to provide a counter flow to the exhaust flow and dosed reductant from the first portion. The second portion of the diverted exhaust gas flow may thus slow and/or redirect the dosed reductant away from the sidewall of the exhaust system, thereby reducing the amount of reductant impacting the sidewalls, which may reduce deposit formation. In some instances, the second portion may be upstream, downstream and/or aligned with the dosing module to control the flow of the dosed reductant into the exhaust system.

II. Overview of Aftertreatment System

FIG. 1 depicts an aftertreatment system 100 having an example reductant delivery system 110 for an exhaust system 190. The aftertreatment system 100 includes a diesel particulate filter (DPF) 102, the reductant delivery system 110, a decomposition chamber or reactor 104, and a SCR catalyst 106.

The DPF 102 is configured to remove particulate matter, such as soot, from exhaust gas flowing in the exhaust system 190. The DPF 102 includes an inlet, where the exhaust gas is received, and an outlet, where the exhaust gas exits after having particulate matter substantially filtered from the exhaust gas and/or converting the particulate matter into carbon dioxide.

The decomposition chamber 104 is configured to convert a reductant, such as urea, aqueous ammonia, or diesel exhaust fluid (DEF), into ammonia. The decomposition chamber 104 includes a reductant delivery system 110 having a dosing module 112 configured to dose the reductant into the decomposition chamber 104. In some implementations, the urea, aqueous ammonia, or DEF is injected upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing $NO_x$ emissions and an outlet for the exhaust gas, $NO_x$ emissions, ammonia, and/or remaining reductant to flow to the SCR catalyst 106.

The decomposition chamber 104 includes the dosing module 112 mounted to the decomposition chamber 104 such that the dosing module 112 may dose a reductant, such as urea, aqueous ammonia, or DEF, into the exhaust gases flowing in the exhaust system 190. The dosing module 112 may each include an insulator 114 interposed between a portion of the dosing module 112 and the portion of the decomposition chamber 104 to which the dosing module 112 is mounted. The dosing module 112 is fluidly coupled to one or more reductant sources 116. In some implementations, a pump (not shown) may be used to pressurize the reductant source 116 for delivery to the dosing module 112.

The dosing module 112 is also electrically or communicatively coupled to a controller 120. The controller 120 is configured to control the dosing module 112 to dose reductant into the decomposition chamber 104. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), erasable programmable read only memory (EPROM), flash memory, or any other suitable memory from which the controller 120 can read instructions. The instructions may include code from any suitable programming language.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 106 includes inlet in fluid communication with the decomposition chamber 104 from which exhaust gas and reductant is received and an outlet in fluid communication with an end of the exhaust system 190.

The exhaust system 190 may further include a diesel oxidation catalyst (DOC) in fluid communication with the exhaust system 190 (e.g., downstream of the SCR catalyst 106 or upstream of the DPF 102) to oxidize hydrocarbons and carbon monoxide in the exhaust gas.

At high exhaust gas flow conditions, the dosed reductant from the dosing module 112 may not be capable of penetrating through the high velocity exhaust flow, which may lead to poor reductant uniformity in the exhaust system.

III. Example Exhaust Assisted Pipe Assembly

Figure 2:
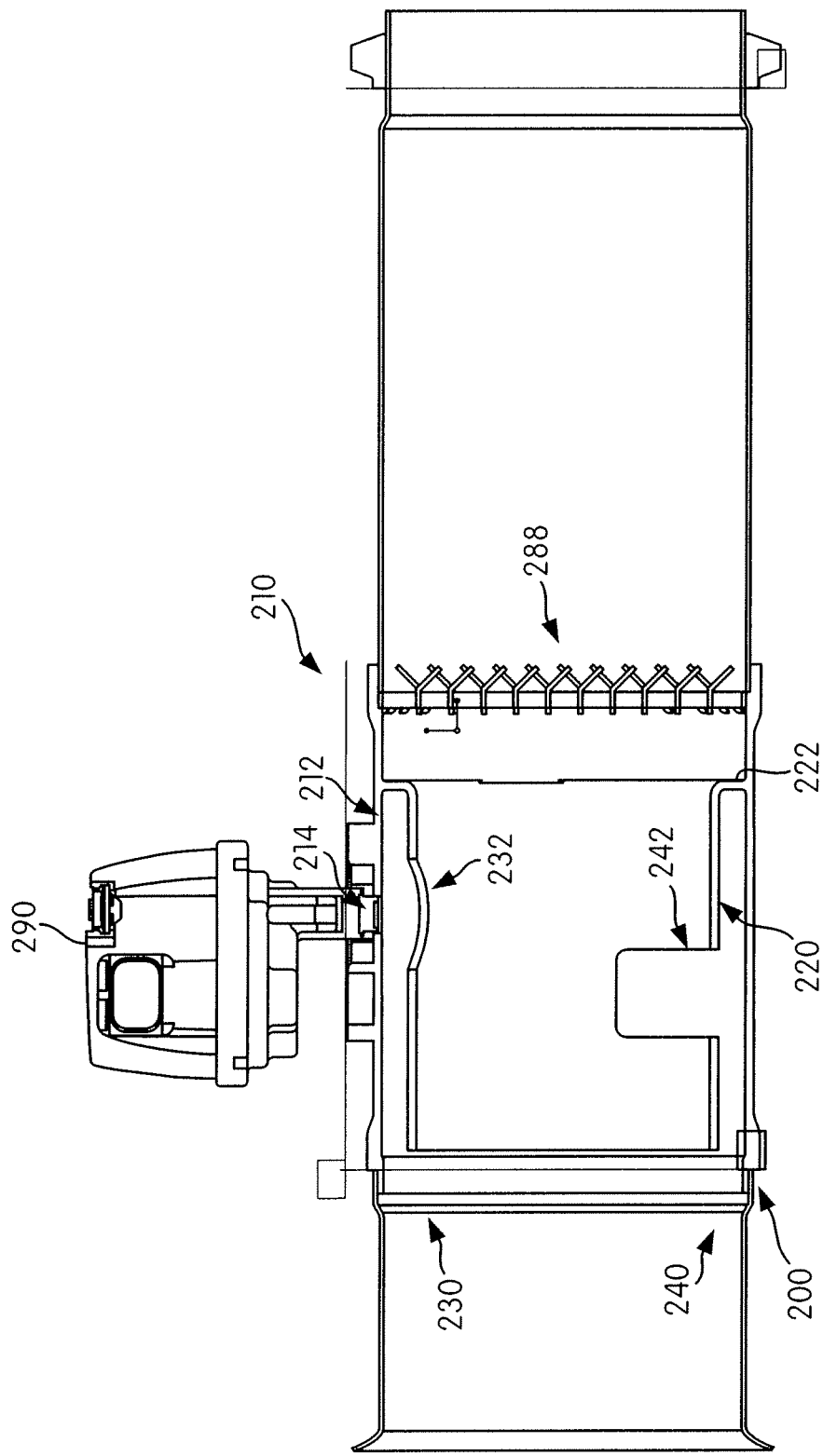
FIG. 2 is a side cross-sectional view of an example decomposition reactor pipe having an exhaust assisted pipe assembly for dosing reductant into the decomposition reactor pipe.
Figure 3:
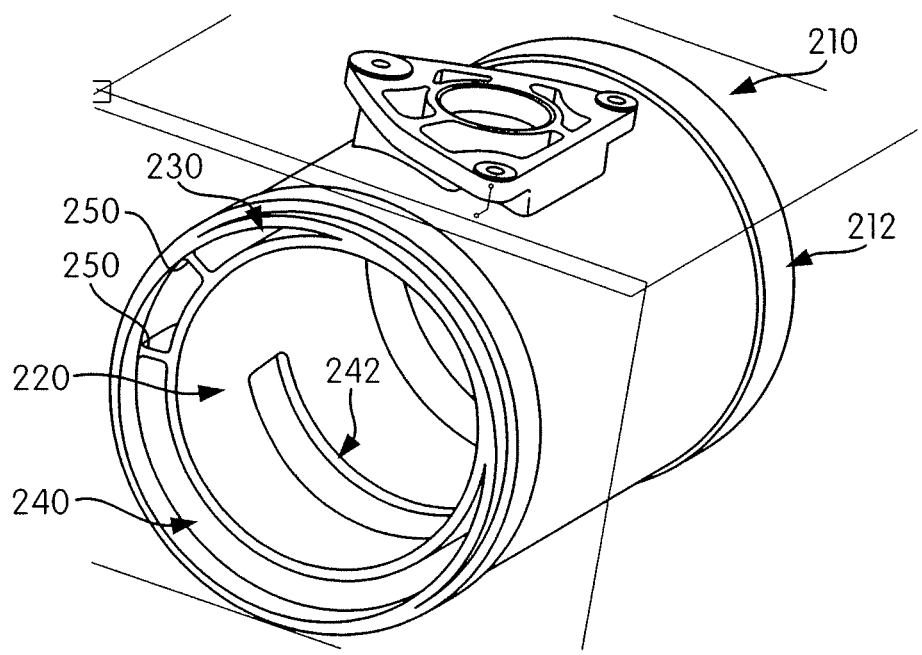
FIG. 3 is a front perspective view of the exhaust assisted pipe of the exhaust assisted pipe assembly of FIG. 2.
Figure 4:
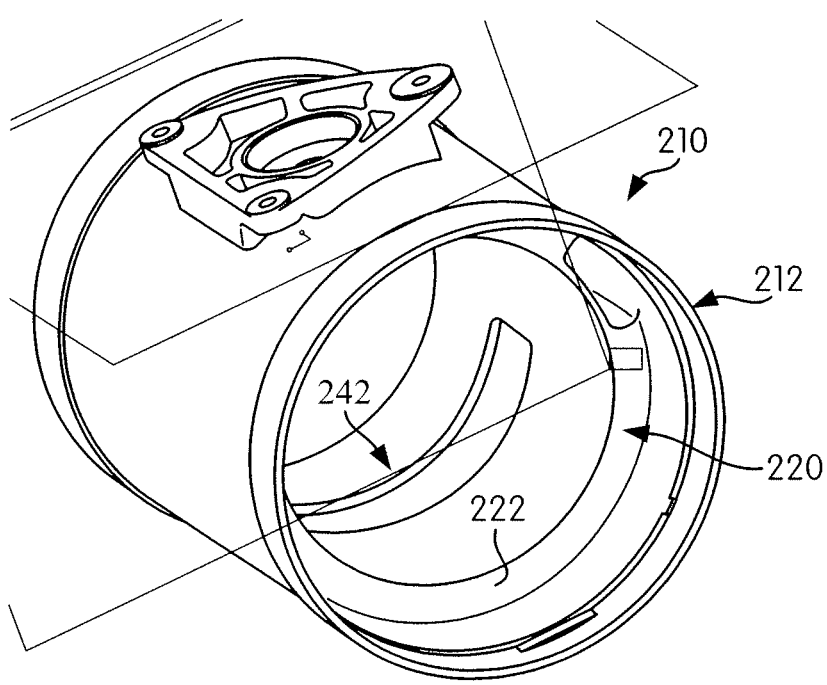
FIG. 4 is a rear perspective view of the exhaust assisted pipe of the exhaust assisted pipe assembly of FIG. 2.
Figure 5:
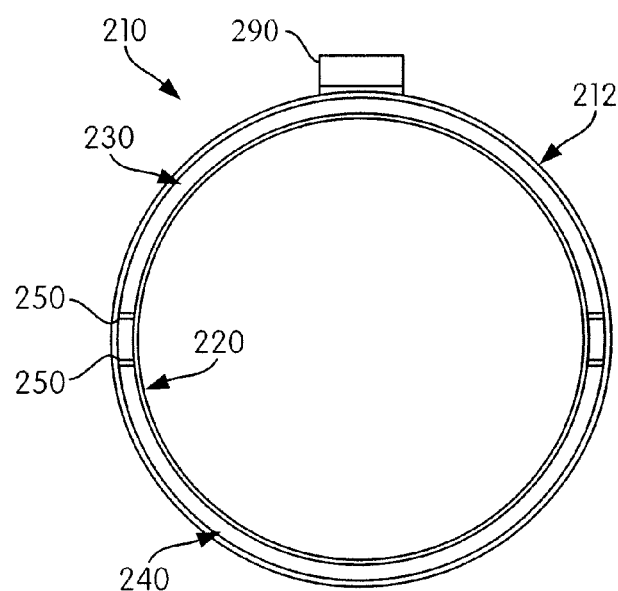
FIG. 5 is a front elevation view of the exhaust assisted pipe and dosing module of the exhaust assisted pipe assembly of FIG. 2.

FIG. 2 depicts a side cross-sectional view of an example decomposition reactor pipe 200 having an exhaust assisted pipe assembly 210 for dosing reductant into the decomposition reactor pipe 200. FIGS. 3-4 depict perspective views of the exhaust assisted pipe assembly 210 from the front (FIG. 3) and the rear (FIG. 4). FIG. 5 depicts a front elevation view of the exhaust assisted pipe assembly 210. The exhaust assisted pipe assembly 210 includes an outer portion 212 and an inner portion 220. The outer portion 212 may be a cylindrical or tubular pipe configured to be coupled to a portion of an exhaust system. For instance, the outer portion 212 may include joints to couple to a portion of a piping of the exhaust system upstream of the exhaust assisted pipe assembly 210 and a portion of piping of the exhaust system downstream of the exhaust assisted pipe assembly 210. In some implementations, the exhaust assisted pipe assembly 210 may be coupled to a portion of the decomposition reactor pipe 200 of an exhaust system. The outer portion 212 includes an opening 214 through which reductant, such as urea, aqueous ammonia, or DEF, may be introduced into the decomposition reactor pipe 200 from a dosing module 290. In some implementations, the dosing module 290 may be mounted to the outer portion 212 of the exhaust assisted pipe assembly 210.

The inner portion 220 includes a structure to form a first flow path and a second flow path, such as an upper flow path and a lower flow path, a front flow path and a rear flow path, and/or a left flow path and a right flow path. In the present example, the inner portion 220 may include a cylindrical or tubular pipe with a smaller diameter than the cylindrical pipe of the outer portion 212 and that is nested within the outer portion 212. That is, the outer portion 212 may include a first tube having a first diameter, and the inner portion 220 may include a second tube having a second diameter less than the first diameter. In other implementations, the inner portion 220 may include a first flat plate and a second flat plate, a square tube, separate cylindrical pipes for a first flow path and a second flow path, etc. In the present example, the inner portion 220 forms a first cavity 230 and a second cavity 240 between the inner portion 220 and the outer portion 212. In some implementations, the first cavity 230 and second cavity 240 may be separated by one or more walls 250 (shown in FIGS. 3 and 5). The cylindrical pipe of the inner portion 220 is coupled to the outer portion 212 via an outlet end 222 that substantially blocks exhaust flow from flowing out the rear end of the first cavity 230 and the second cavity 240. Thus, the inner portion 220 and the outer portion 212 form three separate flow paths, a main flow path for a first portion of a fluid from an upstream source, a first flow path for a second portion of the fluid from the upstream source, and a second flow path for a third portion of the fluid from the upstream source, such as exhaust gas flowing through the exhaust assisted pipe assembly 210. The main flow path is defined by the interior of the interior portion 220. The first flow path is defined by the first cavity 230 formed by the inner portion 220 and the outer portion 212. The second flow path is defined by the second cavity 240 formed by the inner portion 220 and the outer portion 212. Thus, the exhaust gas flow through the exhaust assisted pipe assembly 210 is split among three flow paths such that the flow profile created by the split is the same irrespective of the exhaust flow rate though the decomposition reactor pipe 200.

The inner portion 220 of the first cavity 230 includes a first opening 232 through the inner portion 220 to permit exhaust gas flowing along the first flow path to flow through the first cavity 230 and back into the main flow path through the inner portion 220. In some implementations the first opening 232 is a circular opening. In other implementations the first opening 232 may have other geometric configurations, such as a rectangular slot, a tear drop shape, an ovular opening, a square opening, an egg-shaped opening, a triangular opening, etc. The inner portion 220 of the second cavity 240 includes a second opening 242 through the inner portion 220 to permit exhaust gas flowing along the second flow path to flow through the second cavity 240 and back into the main flow path through the inner portion 220. In some implementations the second opening 242 is a rectangular opening. In other implementations the second opening 242 may have other geometric configurations, such as a circular opening, a tear drop shape, an ovular opening, a square opening, an egg-shaped opening, a triangular opening, etc.

A portion of the first opening 232 may be positioned relative to the opening 214 in the outer portion 212 such that reductant dosed from the dosing module 290 flows into the main flow path. The reductant spray from the dosing module 290 may be introduced to avoid contact with cool chamber walls while mixing with exhaust gas flow to promote water evaporation and urea decomposition. The exhaust gas flowing along the first flow path may be used to assist in accelerating particles of the reductant spray away from the chamber walls at various exhaust flow velocities. That is, the exhaust flow pattern is diverted via the first flow path such that the spray plume of reductant from the dosing module 290 penetrates to the center of the flow without impinging the wall.

The first flow path is configured to direct the exhaust flow past the opening for receiving dosed reductant and into the main flow path to increase momentum of the dosed reductant into the main flow path. The exhaust flow through the first flow path increases the radial momentum of the reductant spray such that the reductant can penetrate to the center of the main exhaust flow path. This optimizes the reductant spray decomposition by minimizing the mass transfer between the reductant spray and the decomposition reactor pipe 200 walls while maximizing the heat transfer between the reductant spray and the exhaust gas. In addition, the exhaust flow through the first flow path also provides a hot, cleaning flow to clean the tip of the injector of the dosing module 290, which may assist in preventing small particles of reductant from recirculating around the injector nozzle and forming deposits on the nozzle. The nozzle of the dosing module 290 may be protected via the exhaust flow along the first flow path and the exhaust gas flow may minimize tip temperatures. The flow remains attached to the pipe wall, thus avoiding deposits and producing high Uniformity Index, which is indicative of the flow uniformity. Thus exhaust assisted pipe assembly 210 directs the exhaust flow to aid in reductant uniformity while minimizing liquid contact with the chamber walls.

At low velocity exhaust flow conditions, the reductant spray from the dosing module 290 may be sufficient to spray the reductant into the center of the main exhaust flow path with minimal assistance from the exhaust gas flowing along the first flow path. At high velocity exhaust flow conditions, the reductant spray from the dosing module 290 may not be sufficient to spray the reductant into the center of the main exhaust flow path. Thus, the high velocity of the exhaust gas flowing along the first flow path is used to increase the momentum of the spray of reductant from dosing module 290 into the exhaust gas flowing along the main exhaust flow path. The exhaust gas assistance may improve reductant uniformity downstream of the exhaust assisted pipe assembly 210. In some implementations, a mixing member 288 may also be positioned downstream of the exhaust assisted pipe assembly 210 to assist the mixing of the reductant with the exhaust gas.

While the first flow path formed by the first cavity 230 assists the spray of reductant in reaching the center of the main exhaust flow path, in some instances the spray of reductant may impact an opposing portion of the exhaust assisted pipe assembly 210 and/or another portion of an exhaust system, thereby potentially forming reductant puddles and/or solid deposits. For instance, at low exhaust flow conditions the reductant spray momentum may be greater than the exhaust flow momentum and can impinge on an opposite portion of the decomposition reactor pipe 200 to the dosing module 290. Thus, in some implementations, a second flow path of exhaust gas may be utilized to direct a portion of the exhaust flow at the dosed reductant to decrease the momentum of the dosed reductant and slow the reductant spray as the spray approaches to opposing wall and/or otherwise guide the reductant spray away from the wall of the decomposition reactor pipe 200.

The second opening 242 through the inner portion 220 permits exhaust gas flowing along the second flow path to flow through the second cavity 240 and back into the main flow path through the inner portion 220. The exhaust gas flowing along the second flow path may be used to assist in decelerating particles of the reductant spray approaching the chamber wall opposite the dosing module 290 at various exhaust flow velocities. For instance, a portion of the second opening 242 may be positioned relative to the spray of reductant from the dosing module 290 such that exhaust gas flowing along the second flow path decreases the radial momentum of the spray as the reductant spray approaches the opposite side of the decomposition reactor pipe 200. The second opening 242 may be upstream of the first opening 232, downstream of the first opening 232, and/or aligned with the first opening 232. In some implementations, a portion of the first opening 232 and a portion of the second opening 242 are formed through the inner portion 220 at opposing sides of the inner portion 220, such as opposite each other of a tubular inner portion 220. When the exhaust gas flow velocity is high, the exhaust gas flowing along the second flow path may be sufficient to substantially prevent the reductant sprayed by the dosing module 290 from impinging on the decomposition reactor pipe 200 wall by reducing the radial momentum of the reductant imparted by the exhaust flow through the first flow path. When the exhaust gas flow velocity is low, the exhaust gas flowing along the second flow path may also be slow, but sufficient to substantially prevent the reductant sprayed by the dosing module 290 from impinging on the decomposition reactor pipe 200 wall. In some instances, even at a low exhaust gas velocity, the exhaust gas flow may be insufficient to fully stop the impingement of the particles on the opposing portion of the decomposition reactor pipe 200 and/or the exhaust assisted pipe assembly 210. The second flow path via the second cavity 240 and the exhaust gas along the main flow path and/or the first flow path allows hot exhaust gas to flow on one or both sides of the area of impingement, thus increasing the convective heat transfer and substantially preventing wall film formation. That is, at some low velocity conditions, the exhaust gas flowing along the second flow path through the second cavity 240 increases the temperature of an outer surface of a wall of the inner portion 220 where dosed reductant sprayed from a dosing module may impinge and the exhaust gas flowing along the main flow path and/or along the first flow path may increase the temperature of an inner surface of the wall of the inner portion 220 where dosed reductant sprayed from a dosing module may impinge. This increases the convective heat transfer to the wall of the inner portion 220 where dosed reductant sprayed from a dosing module may impinge and may substantially prevent wall film formation.

In some implementations, the outlet end 222 may include one or more openings to permit exhaust gas to flow out of the first and/or second cavities 230, 240. The one or more openings may be sized and/or positioned to adjust the flow of exhaust gas through the first flow path and/or the second flow path. In some implementations, the outlet end 222 may be positioned immediately downstream of the first opening 232 and/or the second opening 242. In some instance, the outlet end 222 may be tapered to guide exhaust flow through the first and/or second cavities 230, 240 through the first opening 232 and/or the second opening 242.

In some implementations, several first openings 232 and/or second openings 242 may be formed in the inner portion 220 of the exhaust assisted pipe assembly 210. For instance, several second openings 242 may form a V-shaped or arcuate pattern to control the flow of the exhaust gas and reductant. In some implementations, the exhaust assisted pipe assembly 210 may be a casted component. In particular implementations, the exhaust assisted pipe assembly 210 may be sized to be used with a wide variety of decomposition reactor pipe 200 diameters, including, for example, a 5 inch diameter decomposition reactor pipe 200.

Figure 6A:
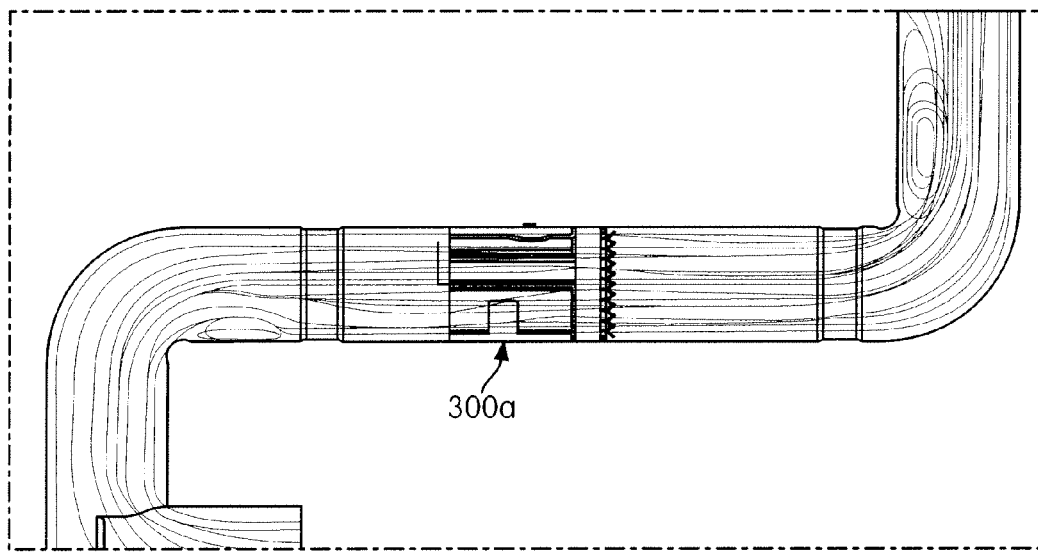
FIG. 6A is a graphical view depicting the exhaust assisted pipe assembly of FIG. 2, showing exhaust flow streamlines at a first operating condition.
Figure 6B:
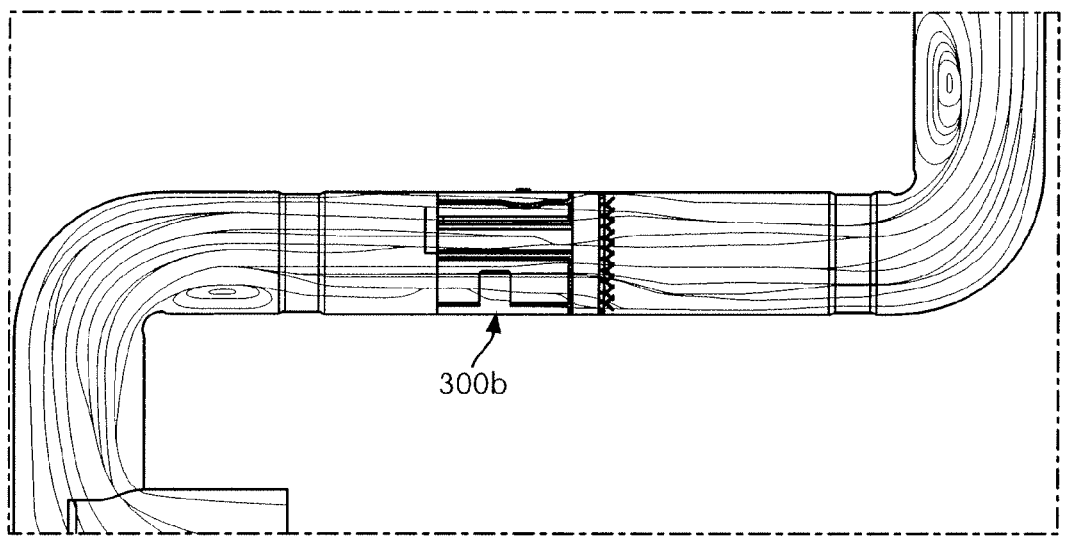
FIG. 6B is a graphical view depicting the exhaust assisted pipe assembly of FIG. 2, showing exhaust flow streamlines at a second operating condition.
Figure 6C:
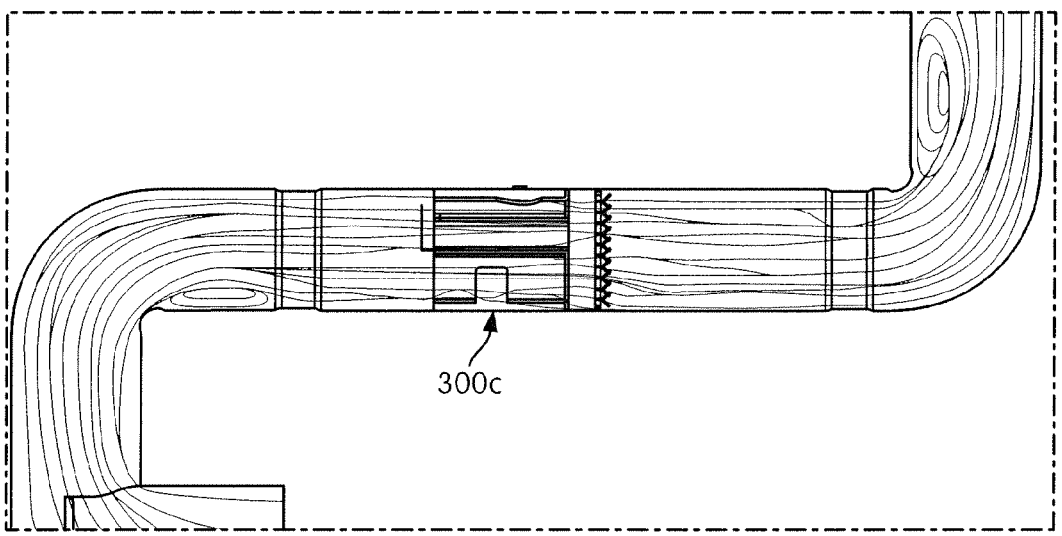
FIG. 6C is a graphical view depicting the exhaust assisted pipe assembly of FIG. 2 showing exhaust flow streamlines at a third operating condition.

FIGS. 6A-6C are graphical views depicting the exhaust assisted pipe assembly of FIG. 2 and showing exhaust flow streamlines 300a, 300b, 300c at various operating conditions. For instance, FIG. 6A depicts the exhaust flow streamlines 300a at a first operating condition having a low exhaust flow velocity. FIG. 6B depicts the exhaust flow streamlines 300b at a second operating condition having a medium exhaust flow velocity. FIG. 6C depicts the exhaust flow streamlines 300c at a third operating condition having a high exhaust flow velocity.

Figure 7A:
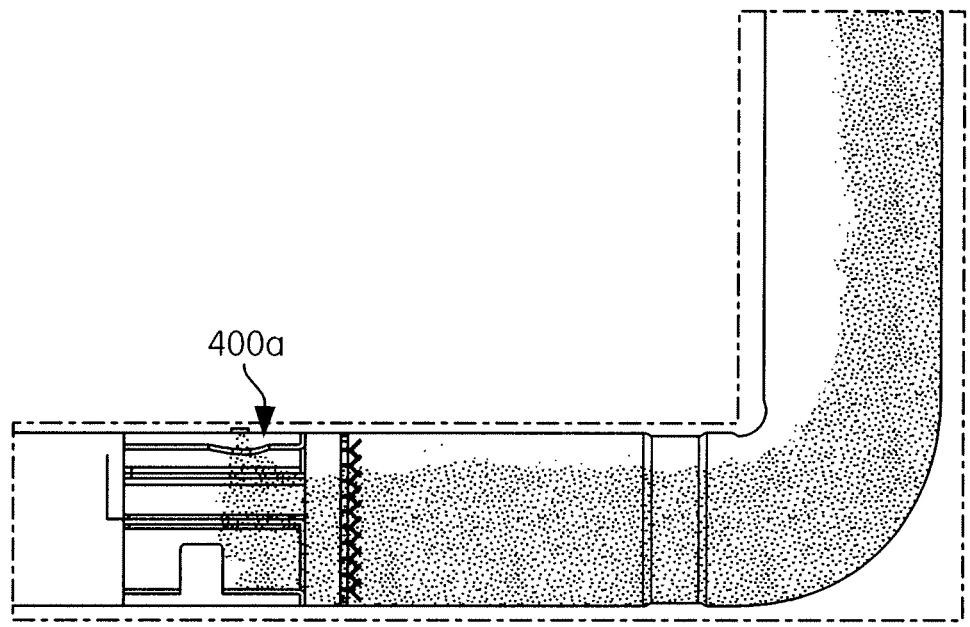
FIG. 7A is a graphical view depicting the exhaust assisted pipe assembly of FIG. 2, showing reductant spray distribution and particle size at the first operating condition.
Figure 7B:
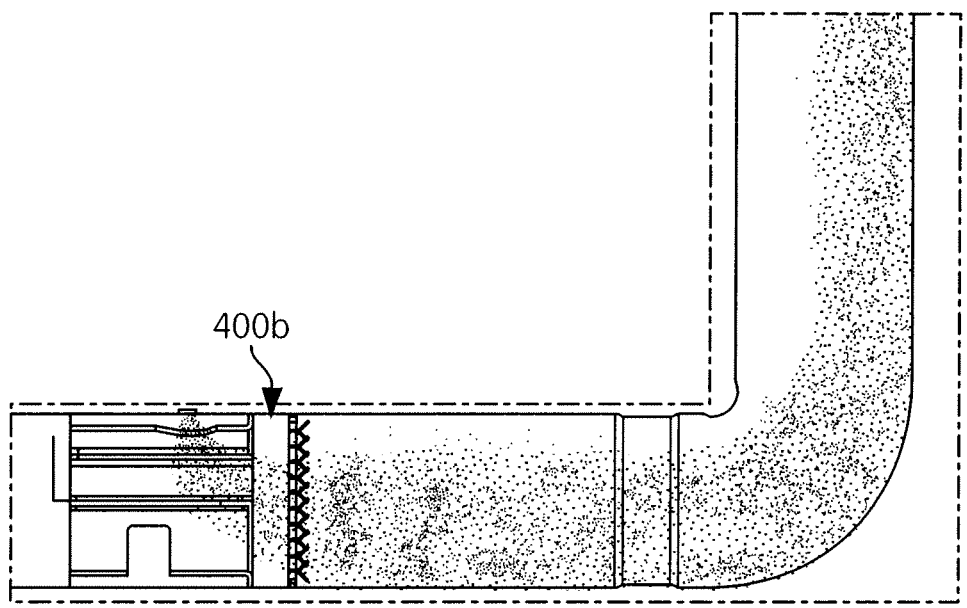
FIG. 7B is a graphical view depicting the exhaust assisted pipe assembly of FIG. 2, showing reductant spray distribution and particle size at the second operating condition.
Figure 7C:
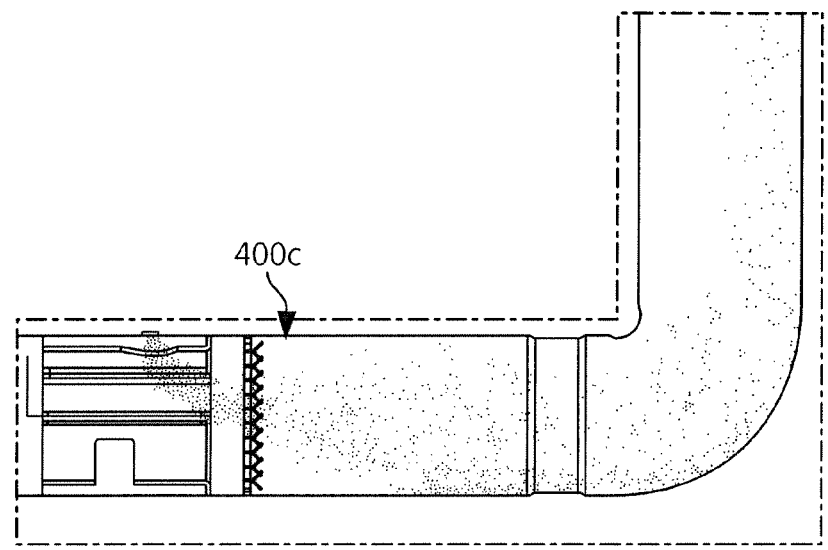
FIG. 7C is a graphical view depicting the exhaust assisted pipe assembly of FIG. 2, showing reductant spray distribution and particle size at the third operating condition.

FIGS. 7A-7C are graphical views depicting the exhaust assisted pipe assembly of FIG. 2 and showing reductant spray distribution 400a, 400b, 400c and particle size at various operating conditions. For instance, FIG. 7A depicts the reductant spray distribution 400a and particle size at the first operating condition having a low exhaust flow velocity. FIG. 7B depicts the reductant spray distribution 400b and particle size at the second operating condition having a medium exhaust flow velocity. FIG. 7C depicts the reductant spray distribution 400c and particle size at the third operating condition having a high exhaust flow velocity.

Figure 8A:
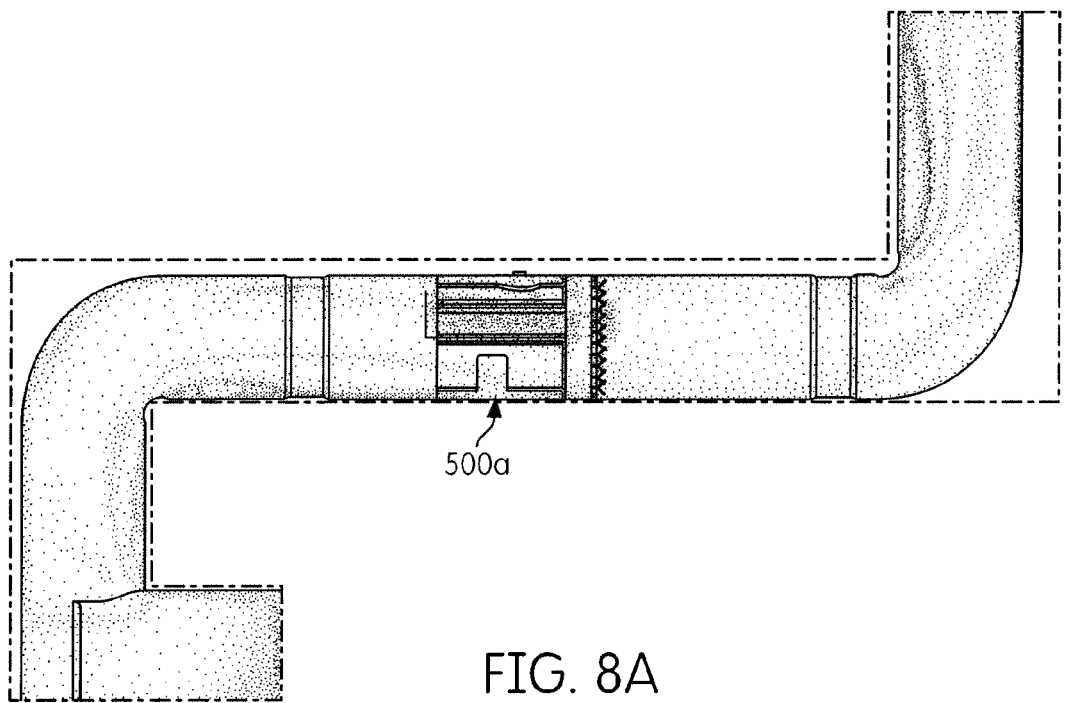
FIG. 8A is a graphical view depicting the exhaust assisted pipe assembly of FIG. 2, showing an exhaust flow velocity profile at the first operating condition.
Figure 8B:
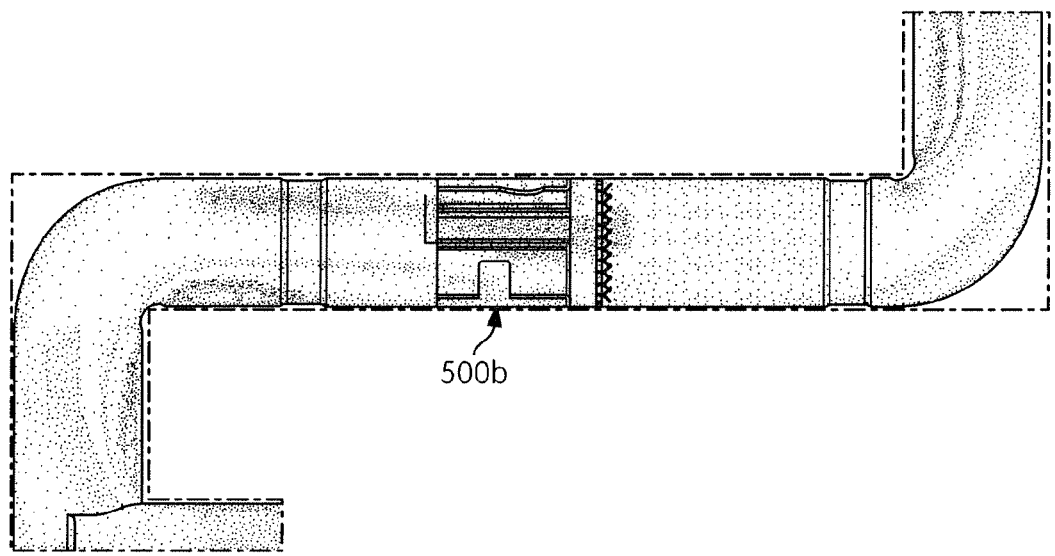
FIG. 8B is a graphical view depicting the exhaust assisted pipe assembly of FIG. 2, showing an exhaust flow velocity profile at the second operating condition.
Figure 8C:
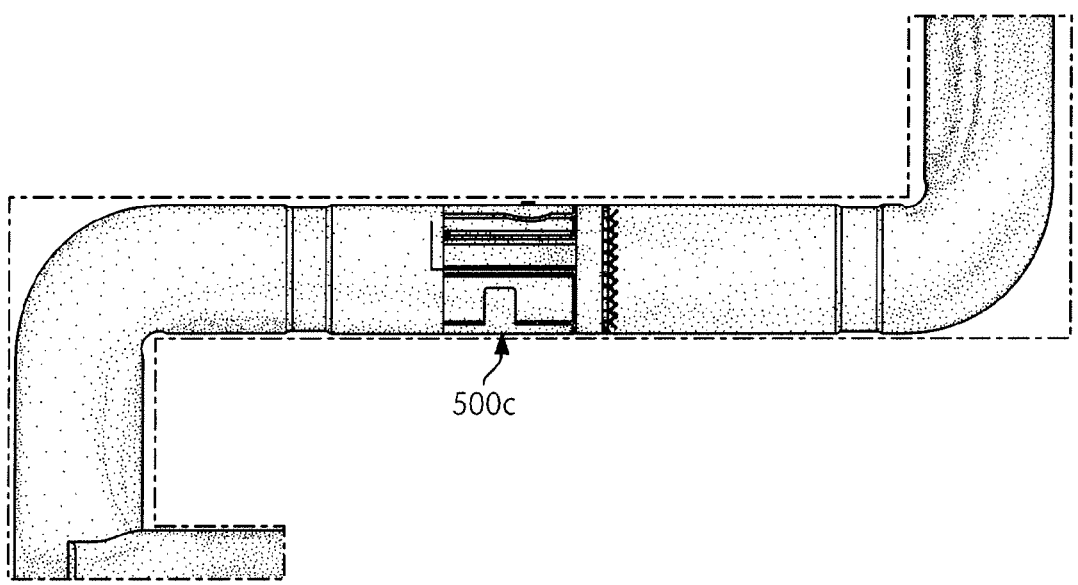
FIG. 8C is a graphical view depicting the exhaust assisted pipe assembly of FIG. 2, showing an exhaust flow velocity profile at the third operating condition.

FIGS. 8A-8C are graphical views depicting the exhaust assisted pipe assembly of FIG. 2 and showing an exhaust flow velocity profile 500a, 500b, 500c at various operating conditions. For instance, FIG. 8A depicts the exhaust flow velocity profile 500a at the first operating condition having a low exhaust flow velocity. FIG. 8B depicts the exhaust flow velocity profile 500b at the second operating condition having a medium exhaust flow velocity. FIG. 8C depicts the exhaust flow velocity profile 500c at the third operating condition having a high exhaust flow velocity.

Figure 9A:
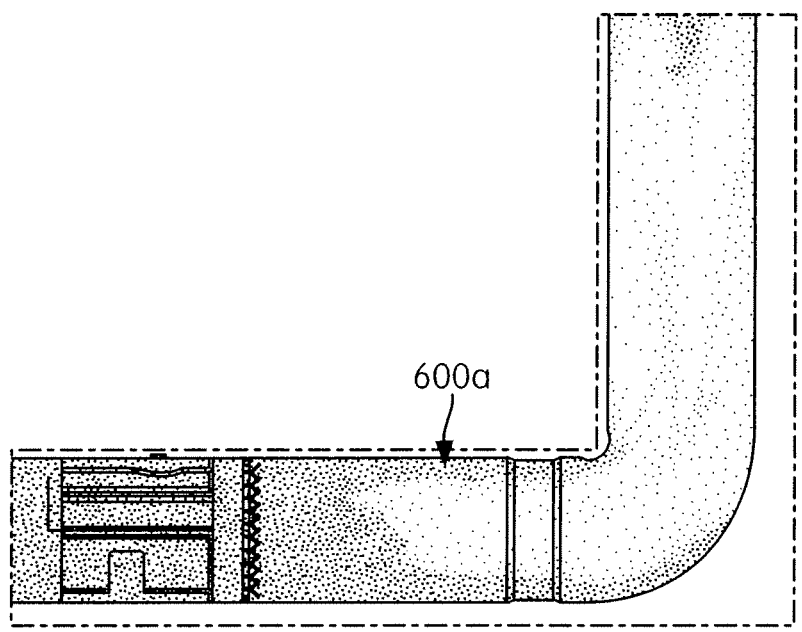
FIG. 9A is a graphical view depicting the exhaust assisted pipe assembly of FIG. 2, showing a reductant mass distribution at the first operating condition.
Figure 9B:
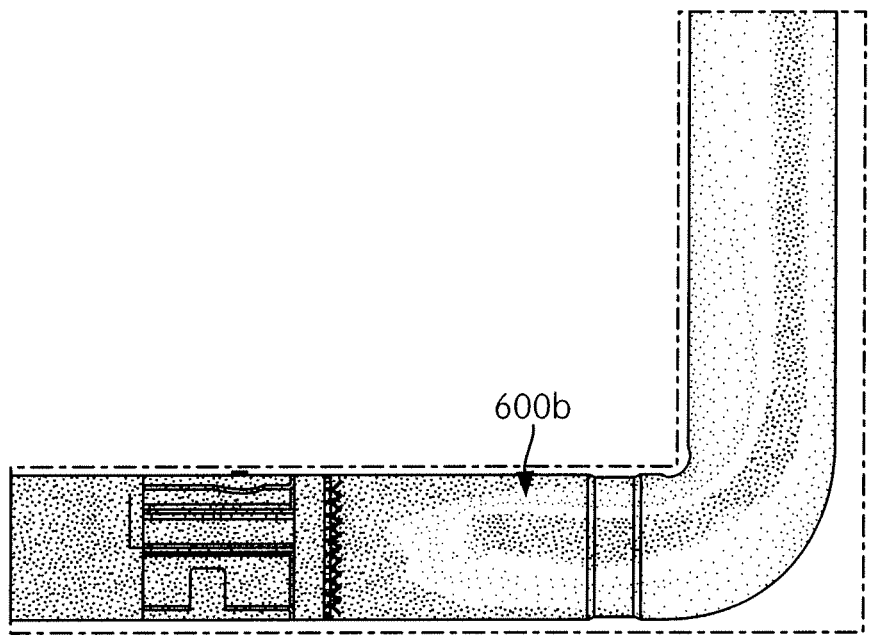
FIG. 9B is a graphical view depicting the exhaust assisted pipe assembly of FIG. 2, showing a reductant mass distribution at the second operating condition.
Figure 9C:
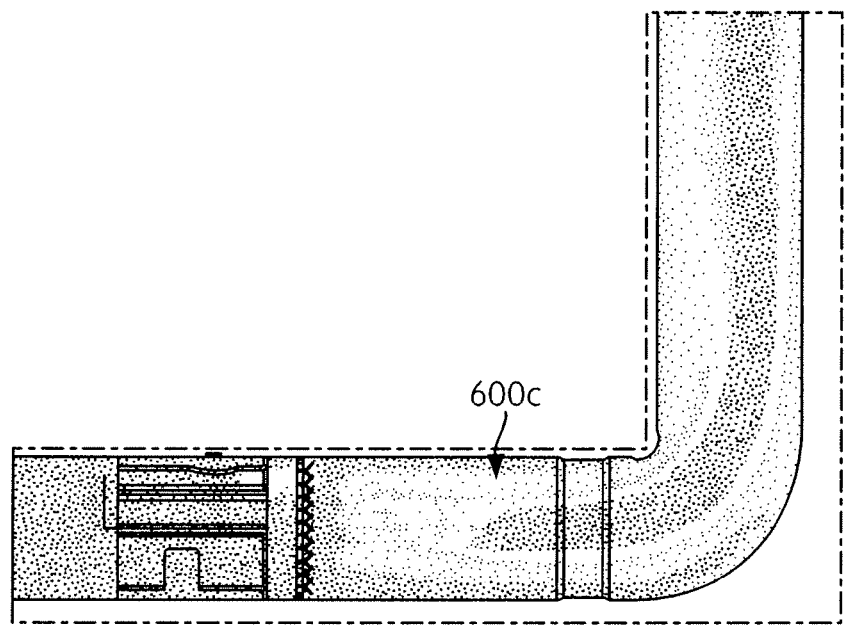
FIG. 9C is a graphical view depicting the exhaust assisted pipe assembly of FIG. 2, showing a reductant mass distribution at the third operating condition.

FIGS. 9A-9C are graphical views depicting the exhaust assisted pipe assembly of FIG. 2 and showing a reductant mass distribution 600a, 600b, 600c at various operating conditions. FIG. 9A depicts the reductant mass distribution 600a at the first operating condition having a low exhaust flow velocity. FIG. 9B depicts the reductant mass distribution 600b at the second operating condition having a medium exhaust flow velocity. FIG. 9C depicts the reductant mass distribution 600c at the third operating condition having a high exhaust flow velocity.

Figure 10:
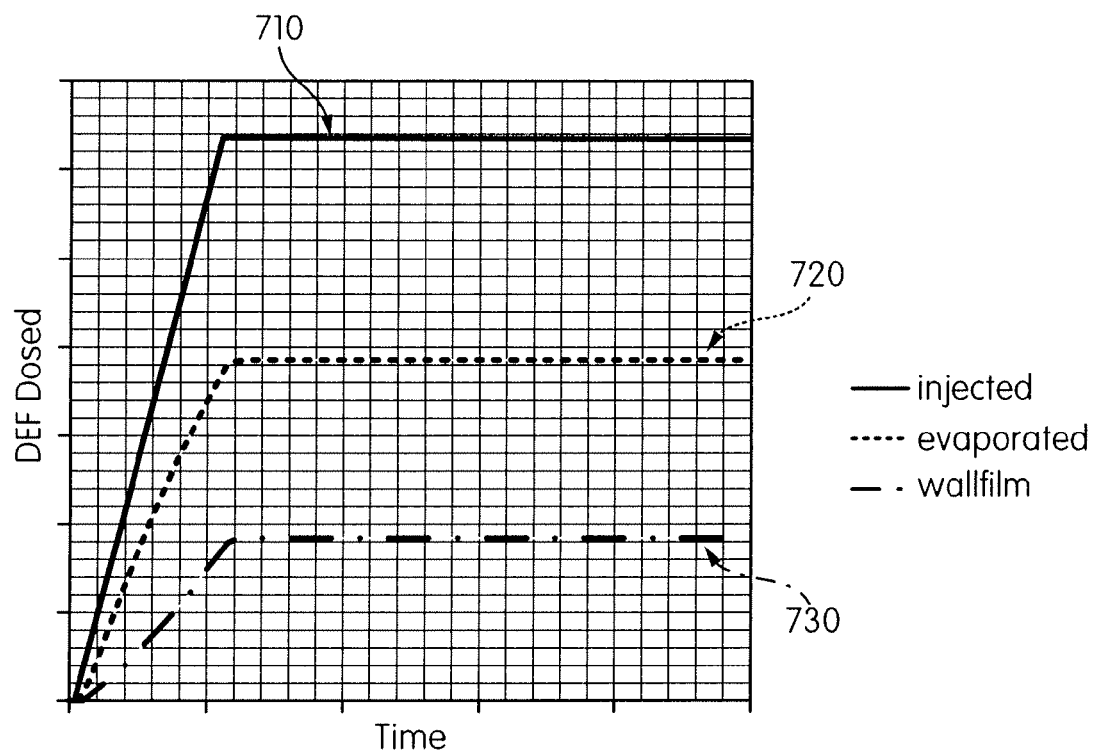
FIG. 10 is a graphical view of an amount of reductant dosed, an amount of reductant evaporated, and an amount of reductant that forms a film on a wall of the exhaust system.

FIG. 10 is a graphical view of a mass amount of reductant dosed 710, a mass amount of reductant evaporated 720, and a mass amount of reductant that forms a film 730 on a wall of the exhaust system for the exhaust assisted pipe assembly 210 of FIG. 2. Approximately 60.4% of the dosed reductant is decomposed into ammonia while 28.9% of the dosed reductant is deposited on a surface of the exhaust system.

Figure 11:
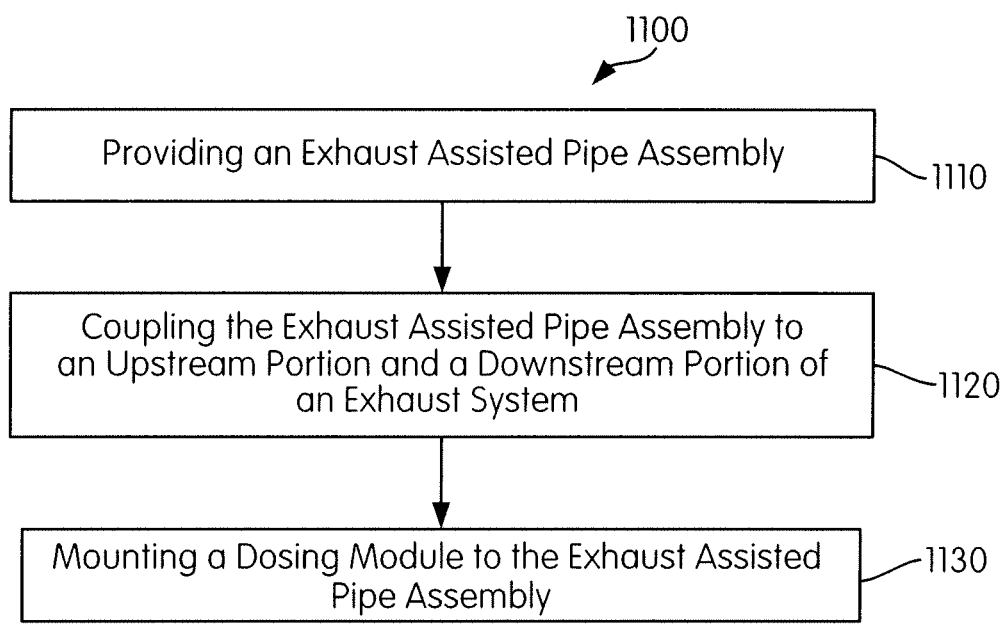
FIG. 11 is a block diagram of an example method of manufacture for assembling an exhaust system with the exhaust assisted pipe assembly.

FIG. 11 is a block diagram of an example method 1100 of manufacture for assembling an exhaust system with an exhaust assisted pipe assembly. The method 1100 may include providing an exhaust assisted pipe assembly (block 1110). The exhaust assisted pipe assembly includes an outer portion and an inner portion. The outer portion may be a cylindrical pipe configured to be coupled to a portion of an exhaust system. For instance, the outer portion may include joints to couple to a portion of a piping of the exhaust system upstream of the exhaust assisted pipe assembly and a portion of piping of the exhaust system downstream of the exhaust assisted pipe assembly. In some implementations, the exhaust assisted pipe assembly may be coupled to a portion of a decomposition reactor pipe of an exhaust system. The outer portion includes an opening through which reductant, such as urea, aqueous ammonia, or DEF, may be introduced into the decomposition reactor pipe from a dosing module.

The inner portion of the exhaust assisted pipe assembly includes a structure to form a first flow path and a second flow path. The structure may include a cylindrical pipe with a smaller diameter than the cylindrical pipe of the outer portion that is nested within the outer portion. In other implementations, the inner portion may include a first flat plate and a second flat plate, a square tube, separate cylindrical pipes for a first flow path and a second flow path, etc. The inner portion forms a first cavity and a second cavity between the inner portion and the outer portion. In some implementations, the first cavity and second cavity may be separated by one or more walls. The cylindrical pipe of the inner portion is coupled to the outer portion via an outlet end that substantially blocks exhaust flow from flowing out the rear end of the first cavity and the second cavity. Thus, the inner portion and the outer portion form three separate flow paths, a first flow path, a second flow path, and a main flow path for exhaust gas flowing through the exhaust assisted pipe assembly.

The exhaust gas flow through the exhaust assisted pipe assembly is split among three flow paths such that the flow profile created by the split is the same irrespective of the exhaust flow rate though the decomposition reactor pipe. The inner portion of the first cavity includes a first opening through the inner portion to permit exhaust gas flowing along the first flow path to flow through the first cavity and back into the main flow path through the inner portion. In some implementations the first opening is a circular opening. In other implementations the first opening may have other geometric configurations, such as a rectangular slot, a tear drop shape, an ovular opening, a square opening, an egg-shaped opening, a triangular opening, etc. The inner portion of the second cavity includes a second opening through the inner portion to permit exhaust gas flowing along the second flow path to flow through the second cavity and back into the main flow path through the inner portion. In some implementations the second opening is a rectangular opening. In other implementations the second opening may have other geometric configurations, such as a circular opening, a tear drop shape, an ovular opening, a square opening, an egg-shaped opening, a triangular opening, etc.

The method 1100 further includes coupling the provided exhaust assisted pipe assembly to an upstream portion and a downstream portion of an exhaust system (block 1120). In some implementations, an upstream portion of the exhaust assisted pipe assembly may be fluidly coupled to the upstream portion of the exhaust system, such as via inserting a portion of the exhaust assisted pipe assembly into the upstream portion of the exhaust system and/or inserting a portion of the upstream portion of the exhaust system into a portion of the exhaust assisted pipe assembly. In some implementations, the upstream portion of the exhaust assisted pipe assembly may be welded to the upstream portion of the exhaust system. In other implementations, the upstream portion of the exhaust assisted pipe assembly may be bolted to the upstream portion of the exhaust system. In further implementations, the upstream portion of the exhaust system may be press fit onto the upstream portion of the exhaust assisted pipe assembly.

The downstream portion of the exhaust assisted pipe assembly may be fluidly coupled to the downstream portion of the exhaust system, such as via inserting a portion of the exhaust assisted pipe assembly into the downstream portion of the exhaust system and/or inserting a portion of the downstream portion of the exhaust system into a portion of the exhaust assisted pipe assembly. In some implementations, the downstream portion of the exhaust assisted pipe assembly may be welded to the downstream portion of the exhaust system. In other implementations, the downstream portion of the exhaust assisted pipe assembly may be bolted to the downstream portion of the exhaust system. In further implementations, the downstream portion of the exhaust system may be press fit onto the downstream portion of the exhaust assisted pipe assembly.

The method 1100 may further include mounting a dosing module to the exhaust assisted pipe assembly (block 1130). For instance, the dosing module may be bolted, strapped, welded, and/or otherwise coupled to a mount formed on the exhaust assisted pipe assembly such that the dosing module may dose reductant into the exhaust assisted pipe assembly.

The term "controller" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as distributed computing and grid computing infrastructures.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

As utilized herein, the term "substantially" and any similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided unless otherwise noted. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The terms "coupled," "connected," and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An exhaust assisted pipe assembly comprising:
   an outer portion including an opening for receiving dosed reductant from a dosing module; and
   an inner portion disposed within the outer portion, the inner portion defining a main flow path for receiving a first portion of a fluid from an upstream source, the inner portion and the outer portion cooperatively defining a first cavity between the inner portion and the outer portion for a first flow path and a second cavity between the inner portion and the outer portion for a second flow path, the first cavity and the second cavity separated by a longitudinally extending wall connecting the outer portion to the inner portion,
      the first flow path of the first cavity receiving dosed reductant from the dosing module through the opening of the outer portion and configured to direct a second portion of the fluid from the upstream source past the opening for receiving dosed reductant and into the main flow path to increase momentum of the dosed reductant into the main flow path, and
      the second flow path of the second cavity configured to direct a third portion of the fluid from the upstream source toward the dosed reductant to decrease the momentum of the dosed reductant in the main flow path.

2. The exhaust assisted pipe assembly of claim 1, wherein the fluid is an exhaust gas.

3. The exhaust assisted pipe assembly of claim 1, wherein the inner portion is a tubular member.

4. The exhaust assisted pipe assembly of claim 1, wherein the inner portion comprises a first opening and a second opening, the first opening permitting the second portion of the fluid to flow from the first flow path into the main flow path, the second opening permitting the third portion of the fluid to flow from the second flow path into the main flow path.

5. The exhaust assisted pipe assembly of claim 4, wherein at least a portion of the first opening is positioned relative to the opening of the outer portion such that dosed reductant from the dosing module flows into the main flow path through the first opening.

6. The exhaust assisted pipe assembly of claim 5, wherein the second opening is upstream relative to the first opening.

7. The exhaust assisted pipe assembly of claim 5, wherein the second opening is downstream relative to the first opening.

8. The exhaust assisted pipe assembly of claim 5, wherein the second opening is aligned opposite to the first opening.

9. The exhaust assisted pipe assembly of claim 1, wherein the outer portion and the inner portion comprise straight tubular pipe portions.

10. The exhaust assisted pipe assembly of claim 1, wherein an outlet end of the inner portion is coupled to the outer portion.

11. The exhaust assisted pipe assembly of claim 10, wherein the outlet end of the inner portion coupled to the outer portion blocks the second portion of fluid flowing along the first flow path from flowing out an outlet end of the first cavity.

12. The exhaust assisted pipe assembly of claim 11, wherein the outlet end of the inner portion coupled to the outer portion blocks the third portion of fluid flowing along the second flow path from flowing out an outlet end of the second cavity.

13. The exhaust assisted pipe assembly of claim 1, wherein the third portion of the fluid flowing along the second flow path increases a temperature of a surface of the inner portion.

14. An exhaust system comprising:
   a first portion of an exhaust system and a second portion of the exhaust system, the first portion receiving exhaust gas;
   an exhaust assisted pipe assembly coupled at an upstream end to the first portion of the exhaust system to receive the exhaust gas from the first portion and coupled at a downstream end to the second portion of the exhaust system, the exhaust assisted pipe assembly comprising:
      an outer portion having an opening for receiving dosed reductant from a dosing module; and
      an inner portion disposed within the outer portion, the inner portion defining a main flow path through the inner portion for receiving a first portion of the exhaust gas, the main flow path directing the first portion of the exhaust gas along a length of a surface of the inner portion opposite the dosing module to increase a temperature of the inner portion, the inner portion and the outer portion cooperatively defining a first cavity defining a first flow path for a second portion of the exhaust gas and a second cavity defining a second flow path for a third portion of the exhaust gas, the first cavity and the second cavity separated by a longitudinally extending wall connecting the outer portion to the inner portion, the first flow path of the first cavity receiving dosed reductant from the dosing module through the opening of the outer portion and configured to direct the second portion of the exhaust gas past the opening for receiving dosed reductant and into the main flow path to increase momentum of the dosed reductant into the main flow path, and the second flow path of the second cavity configured to direct the third portion of the exhaust gas toward the dosed reductant to decrease the momentum of the dosed reductant in the main flow path and configured to direct the third portion of the exhaust gas along the length of the surface of the inner portion to increase the temperature of the inner portion.

15. The exhaust system of claim 14, wherein the outer portion comprises a first tube having a first diameter, and wherein the inner portion comprises a second tube having a second diameter less than the first diameter.

16. The exhaust system of claim 14, wherein the outer portion comprises a mount for a dosing module.

17. The exhaust system of claim 14, wherein the inner portion comprises a first opening and a second opening, the first opening permitting the second portion of the fluid to flow from the first flow path into the main flow path, the second opening permitting the third portion of the fluid to flow from the second flow path into the main flow path, a portion of the first opening and a portion of the second opening positioned on opposing sides of the inner portion.

18. A method for assembling an exhaust system with an exhaust assisted pipe assembly comprising:

providing an exhaust assisted pipe assembly having an upstream portion and a downstream portion, the exhaust assisted pipe assembly including an outer pipe and an inner pipe coupled together at an outlet end of the inner pipe and one or more longitudinal walls extending from the inner pipe to the outer pipe, the outer pipe including an opening for dosing reductant, the inner pipe defining a main flow path through the exhaust assisted pipe assembly, the outer pipe, inner pipe, coupled outlet end, and the one or more longitudinal walls defining a first cavity for a first flow path and a second cavity for a second flow path between the outer pipe and the inner pipe, the inner pipe including a first opening through the inner pipe to permit exhaust gas flowing along the first flow path and reductant dosed through the opening of the outer pipe to flow through the first cavity and into the main flow path, the inner piper including a second opening through the inner pipe to permit exhaust gas flowing along the second flow path to flow through the second cavity and into the main flow path, a portion of the first opening and a portion of the second opening positioned on opposing sides of the inner portion;

coupling the upstream portion of the exhaust assisted pipe assembly to an upstream portion of an exhaust system and a downstream portion of the exhaust assisted pipe assembly to a downstream portion of an exhaust system; and mounting a dosing module to a mount of the exhaust assisted pipe assembly.

19. The method of claim 18, wherein the second flow path is configured to direct the third portion of the exhaust gas toward dosed reductant to decrease momentum of dosed reductant in the main flow path.

* * * * *